(12) United States Patent
Jones et al.

(10) Patent No.: US 7,006,457 B2
(45) Date of Patent: Feb. 28, 2006

(54) MODEM FRONT-END APPARATUS AND METHOD

(75) Inventors: Thomas Herbert Jones, Westfield, IN (US); Xaiodong Liu, Carmel, IN (US); Jeffery Lynn Taylor, Rushville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 930 days.

(21) Appl. No.: 09/943,057

(22) Filed: Aug. 30, 2001

(65) Prior Publication Data

US 2003/0043807 A1    Mar. 6, 2003

(51) Int. Cl.
*H04B 3/30* (2006.01)

(52) U.S. Cl. ............... 370/285; 370/401; 370/466; 370/493; 370/516; 725/100; 725/110; 725/111; 725/139; 725/145; 375/222

(58) Field of Classification Search ............... 370/285, 370/401, 395.1, 466, 463, 493, 516; 725/100, 725/110, 111, 139, 145, 146; 375/222
See application file for complete search history.

(56) References Cited

U.S. PATENT DOCUMENTS

| | | | | |
|---|---|---|---|---|
| 5,499,046 | A | * | 3/1996 | Schiller et al. ............. 725/146 |
| 5,537,408 | A | | 7/1996 | Branstad et al. ............. 370/79 |
| 5,722,041 | A | | 2/1998 | Freadman .................... 455/6.3 |
| 5,734,589 | A | * | 3/1998 | Kostreski et al. ............ 715/716 |
| 5,745,642 | A | | 4/1998 | Ahn ............................ 386/95 |
| 5,905,732 | A | | 5/1999 | Fimoff et al. ................ 370/516 |
| 5,926,479 | A | | 7/1999 | Baran ......................... 370/395 |
| 5,961,589 | A | * | 10/1999 | Hansen ........................ 709/205 |
| 6,006,318 | A | | 12/1999 | Hansen et al. ................ 712/28 |
| 6,073,179 | A | | 6/2000 | Liu et al. ..................... 709/229 |
| 6,092,122 | A | | 7/2000 | Liu et al. ..................... 709/277 |
| 6,169,569 | B1 | | 1/2001 | Widmer et al. ............... 348/11 |
| 6,208,665 | B1 | | 3/2001 | Loukianov et al. ......... 370/486 |
| 6,271,837 | B1 | | 8/2001 | Naiff .......................... 345/327 |
| 6,868,292 | B1 | * | 3/2005 | Ficco et al. .................. 700/19 |
| 2002/0184649 | A1 | * | 12/2002 | Wilson ....................... 725/114 |

FOREIGN PATENT DOCUMENTS

| | | |
|---|---|---|
| EP | 0 722 233 | 7/1996 |
| GB | 0722233 | * 7/1996 |

OTHER PUBLICATIONS

*EPO Search Report dated Jun. 16, 2004 attached*.

* cited by examiner

*Primary Examiner*—Dang Ton
*Assistant Examiner*—Inder Pal Mehra
(74) *Attorney, Agent, or Firm*—Joseph S. Tripoli; Ronald H. Kurdyla; Guy H. Eriksen

(57) ABSTRACT

A method and apparatus for recovering a second transport stream included within a first transport stream and reducing timing anomaly imparted to the second transport stream within the context of a front-end device subject to random access via a data bus, illustratively a PCI bus. A first transport stream is received from a transport medium, the first transport stream having disposed therein packets associated with a second transport stream. The first medium tending to impart jitter to the first transport stream. Those packets associated with the second transport stream are extracted from the first transport stream and adapted to reduce jitter, and launched via a second transport medium, the launched adapted packets forming a jitter-reduced second transport stream.

19 Claims, 2 Drawing Sheets

MODEM FRONT-END APPARATUS AND METHOD

The invention relates to bidirectional communications devices such as modems and, more particularly, to a modem providing timing error processing functions adapted to application interface timing anomalies.

BACKGROUND OF THE INVENTION

Modems are currently utilized as discrete computer peripherals that interface a host device such as a personal computer (PC), with an external broadband gateway or access network such as provided by a cable television or telecom company. A modem may be considered a "front-end" device, which retrieves information from the access network and provides the information to a "back-end" device, such as a PC. In a typical configuration, a modem such as a digital subscriber line (DSL) or cable modem interfaces to a PC via a peripheral component interconnect (PCI) slot associated with the PC.

The PCI slot is typically one of many PCI slots or interface connections sharing a common PCI bus architecture. Thus, access of one device communicating via the PCI bus results in at least a brief servicing of a PCI bus interrupt or other command by each of the other devices communicating via the PCI bus. This brief servicing requirement tends to produce "jitter" or other timing anomalies, which may be deleterious to the routing of time sensitive data.

In the case of MPEG audiovisual data, excessive network jitter, or the improper recovery of the 27 MHz clock associated with an MPEG transport stream can cause buffer overflow, buffer underflow, undesirable color changes and other deleterious phenomenon which result in improper presentation of the audiovisual material being conveyed. Such network jitter or improper clock recovery (or other timing operations) may be caused by PCI bus access/servicing.

SUMMARY OF THE INVENTION

The invention comprises a method and apparatus adapted to recovering a second transport stream included within a first transport stream and reducing timing anomaly imparted to the second transport stream within the context of a front-end device subject to random access via a data bus, illustratively a PCI bus.

A method according to one embodiment of the present invention comprises receiving, from a first medium a first transport stream having disposed therein packets associated with a second transport stream, the first medium tending to impart jitter to the first transport stream, extracting, from the first transport stream, those packets associated with the second transport stream; adapting the extracted packets in a manner tending to reduce the jitter; and transmitting the adapted packets via a transport second medium, the transmitted adapted packets forming a jitter-reduced second transport stream.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

The invention will be described within the context of a front-end device comprising a digital subscriber line (DSL) modem, which interfaces to a back-end device comprising a computing device such as a personal computer (PC) or set top terminal (STT). Data received from a network via the front-end device is typically coupled to a PCI interface for subsequent processing by the back-end device. The invention instead routes data directly to the back-end device for subsequent processing. Clock recovery and buffer management of, illustratively, a received asynchronous MPEG data stream may be performed in the front-end device by a data control/jitter processor such that back-end MPEG decoder functions do not need to include such functions. In this manner, a direct memory access (DMA) transfer of received MPEG data using the PCI interface is avoided, thereby reducing the amount of PCI bus access necessary to effect data transfer from the front-end device to the back-end device.

Figure 1:
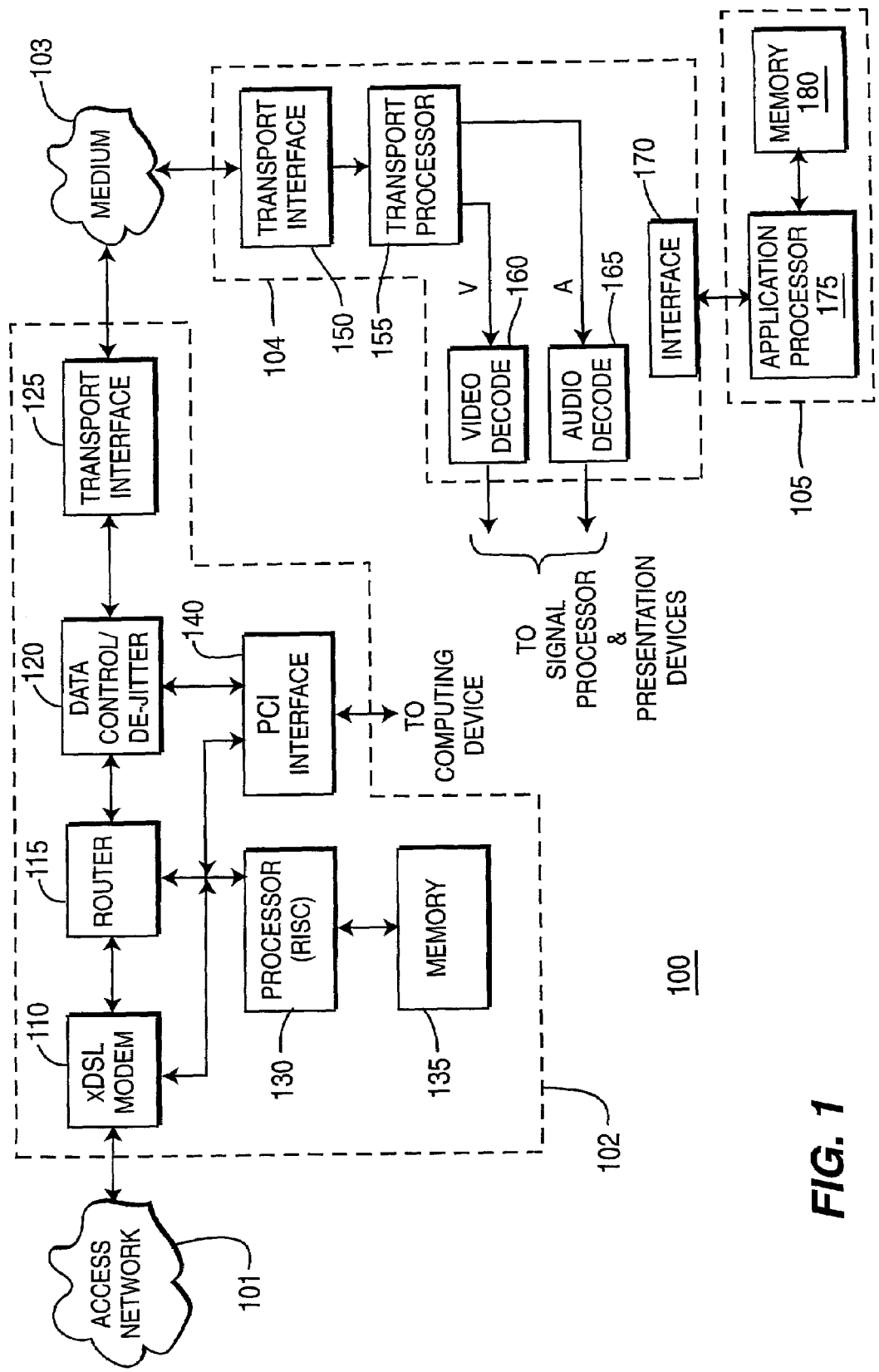
FIG. 1 depicts a high-level block diagram of a system benefiting from the present invention.

FIG. 1 depicts a high-level block diagram of a system benefiting from the present invention. Specifically, FIG. 1 depicts a high-level block diagram of a system 100 comprising a first medium such as an access network 101 in communication with a "front-end" device 102. The front-end device 102 communicates with a "back-end" device 104 via a second medium 103. It is noted that the second medium 103 tends to impart little or no timing errors or data degradation to a data stream transmitted therethrough in comparison to the first medium 101. The front-end 102 also communicates with a computing device (not shown) via a known interface, such as a peripheral component interconnect (PCI) interface, universal serial bus (USB) interface, small computer serial interface (SCSI) interface or the like. The back-end 104 communicates with an application 105 via an application interface 170.

In an exemplary embodiment, a transport stream according to a first transport format (such as asynchronous transfer mode (ATM), Internet protocol (IP) or other known transport protocol) is received by the front-end device 102 from the access network 101. In the case of the access network 101 comprising a telecommunications network, the front-end device 102 implements a telecommunications interface function, such as digital subscriber line (DSL) or other suitable interface function. If the access network 101 comprises a digital cable television distribution network, then the front-end 102 implements a cable modem interface function. Other access network/front-end combinations, e.g., satellite, POTS, etc., are readily known to those skilled in the art. FIG. 1 is primarily described within the context of a DSL-compliant access network.

The front-end device 102 comprises an xDSL modem 110, a router 115, a data control/de-jitter module 120, a transport interface 125, a processor 130, memory 135 and a PCI interface 140. The front-end device 102 advantageously processes timing information associated with one or both of the received transport stream and the transport stream to be provided to the back-end device 104. These timing parameters are used to determine timing anomalies and the front-end device corrects such anomalies to the extent possible prior to transmission of recovered data via the medium 103 to the back-end device 104.

The xDSL modem 110 interfaces with the access network 101 to transmit and receive data arranged according to a transport format suitable for use in the access network 101. The xDSL modem 110 routes data to and from the data control/de-jitter module 120 via router 115. The xDSL modem 110 and router 115 communicate with the processor 130, illustratively a reduced instruction set computer (RISC) processor. The processor 130 coordinates the functions of the xDSL modem 110 and router 115. The processor 130 cooperates with memory 135, which is used to store instructions and serve as temporary storage and/or buffer memory for the front-end 102.

The processor 130 also cooperates with various support circuitry (not shown), such as cache memory, clock circuits, power circuits and the like.

The router 115 operates to extract transport packets adapted to subsequent processing via the back-end 104 from the data received from the access network 101. In the case of the access network 101 transporting packets using a format appropriate to the back-end processor 104, the router 115 simply routes the appropriate packets to the data control/de-jitter module 120. In the case of the access network 101 transporting packets using a format different than utilized by the back-end processor 104, the router 115 operates to extract from the access network packet structure information according to the packet structure compatible with the back-end processor 104.

The data control/de-jitter module 120 processes timing parameters associated with the extracted packets and, optionally, timing parameters associated with the transport packets received from the access network 101. The timing parameters processed include, for example, clock recovery parameters such as those associated with the recovery of a 27 MHz MPEG system clock. In one embodiment of the invention, the second transport stream comprises an MPEG transport stream having inserted therein reference packets comprising portions of the 27 MHz MPEG system clock. That is, each reference packet includes a program clock reference (PCR) used to synchronize a recovery clock such that recovery of the MPEG transport packets and various system synchronization functions may be performed. Having recovered the 27 MHz MPEG system clock, additional timing parameters may be processed, such as presentation time stamp (PTS), decode time stamp (DTS) and other parameters.

The PCR-derived recovery clock (and, optionally, other timing parameters) is used by the data control/de-jitter module 120 to determine whether recovered packets have been subjected to timing anomalies such as dropped packets, delayed packets, jitter and other anomalies. Such anomalies may be caused by the access network 101, other networks (not shown) connected to the access network 101 and used to transport the data, and interruptions of the front end device 102 via computing device demands placed upon the PCI interface 140. In response to this determination, appropriate data and such or timing processing operations are performed. For example, transport packets may be "res-tamped" such that timing anomalies are removed from a contiguous sequence of transport packets. In the case of dropped, missing or otherwise corrupted transport packets, such packets may be replaced by new packets (using forward error correction techniques, for example). Corrupted packets may be suppressed to avoid timing or decoder errors in the back-end device. Generally speaking, data control/de-jitter module 120 is used to correct the timing parameters associated with the included or back-end packet structure. The corrected packets are coupled to the transport interface 125, which performs all necessary transport interface functions enabling the transport of the data to back-end processor 104 via medium 103.

The data control/de-jitter module 120 also cooperates with the PCI interface 140 to communicate with a computing device (not shown) such as a personal computer (PC) or other computing device. The computing device provides information to the data control/de-jitter module 120 useful in determining which timing parameters are to be processed, which formats are utilized by the access network 101 and back-end device 104, and other information. The PCI interface 140 may be replaced by a universal serial bus (USB) interface device, small computer serial interface (SCSI) or other known interface device. It is noted that timing anomalies may occur due to PCI, USB or SCSI interface servicing demands placed upon the front-end device.

The back-end device 104 illustratively comprises a transport interface 150, a transport processor 155, a video decoder 160, an audio decoder 165, and an optional application interface module 170. The back-end device 104 receives from the second medium 103, illustratively, a transport stream comprising audiovisual information such as an MPEG transport stream. The transport interface 150 performs known transport interface functions upon the received transport stream and couples the received transport stream to the transport processor 155. The transport processor 155 performs known transport processing functions such as demultiplexing a particular one transport stream from a signal comprising a plurality of transport streams, demultiplexing video and audio elementary streams from the selected transport stream and coupling the resulting video V and audio A packetized or non-packetized elementary streams to, respectively, video decoder 160 and audio decoder 165.

Each of the video decoders 160 and audio decoders 165 operate to decode, respectively, video stream V and audio stream A to produce resulting decoded video and audio streams. The decoded video and audio streams are coupled to a signal processor and, subsequently, respective presentation devices (not shown). The optional interface 170 cooperates with an application 105 and, specifically, an application processor 175. The application processor 175 is associated with memory 180 running the application.

In an exemplary embodiment of the invention, the back-end device 104 utilizes a first RISC processor to implement the transport interface 150 and transport processor 155 functions. Additionally, each of the video decoder 160 and audio decoder functions is implemented by a respective RISC processor. In the exemplary embodiment, the interface 170 comprises a RISC interface, which cooperates with the application processor 175, illustratively an application RISC. The memory 180 is used by the application RISC 175 and, optionally, one or more of the video decoder RISCs 160, audio decoder RISCs 165 and transport RISC 150–155.

The above-described apparatus, in accordance with the principles of the invention and utilizing the various previously described RISC processors, provides an architecture that scales very well for increased data rates. Specifically, while a back-end RISC engine will eventually run out of processing power to route data if the back-end engine also performs timing functions, the apparatus of the present invention does not. This is because the front-end of the present invention performs the timing functions that otherwise limit the data rate that the back end device 104 is capable of sustaining.

In one embodiment of the invention, a set top terminal implementing DSL functionality does not function as a gateway device. In this embodiment of the invention, the front-end device 102 may be simplified by deleting router/switch mechanism and the PCI interface. That is, where the front-end device does not need to communicate with a computing device, the PCI interface 140 and router 115 may be avoided.

A computing device capable of implementing methods according to the present invention is formed using the various processors implementing the front-end device 102 and back-end device 104, as well as corresponding memory devices and input/output devices. As such, it is contemplated that some of the process steps discussed herein as software processes may be implemented within hardware, for example, as circuitry that cooperates with the above-referenced processors, input/output (I/O) devices such as the above-referenced interface devices, and the various memory devices. It will be noted that some of the process implementations discussed herein are discussed herein in terms of a general-purpose computer that is programmed to perform various clock recovery, data recovery, clock and data processing and other functions in accordance with the present invention. It will be noted that the invention may be implemented in hardware as, for example, an application specific integrated circuit (ASIC), such as a modem integrated circuit (IC) implementing the front-end device 102 and/or the back-end device 104. As such, the process steps described herein are intended to be broadly interpreted as being equivalently performed by software, hardware, or a combination thereof.

Figure 2:
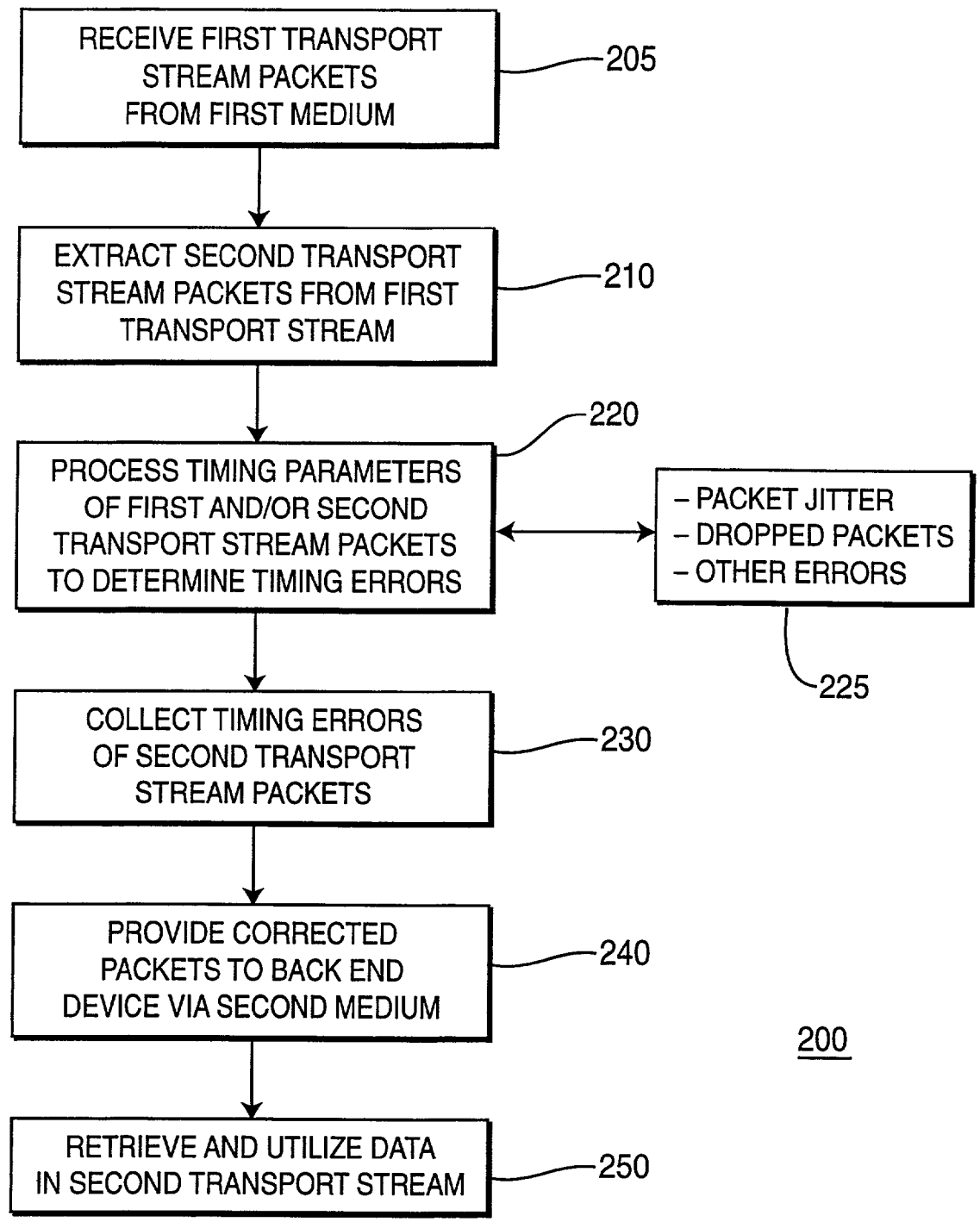
FIG. 2 depicts a flow diagram of a processing method according to an embodiment of the invention.

FIG. 2 depicts a flow diagram of a processing method according to an embodiment of the invention. Specifically, the processing method 200 of FIG. 2 is entered at step 205 where first transport stream packets are received by the front end device 102 from a first medium, illustratively an access network 101, such as an illustrative telecommunications network.

At step 210, second transport stream packets are extracted from the first transport stream. That is, while the first transport stream is being received, those packets within the first transport stream associated with an included second transport stream are extracted.

At step 220, timing parameters associated with the first transport stream packets and/or second transport stream packets are processed to determine whether any timing errors exist. That is, referring to box 225, the timing parameters from one or both of the first and/or second transport streams are processed to identify packet jitter, dropped packets, packet corruption and other timing errors.

As previously noted, other timing errors may comprise those errors due to the servicing of the PCI interface 140 (or corresponding USB, SCSI or other interface).

At step 230, timing errors within the second transport stream packets are corrected to the extent possible. For example, in the case of packet jitter or other timing errors, anti-jitter processing techniques are utilized to correct the determined packet jitter errors. In this manner, the packets associated with the second transport stream are processed such that timing errors induced by, for example, the first medium or access network 101 (or an initial transmission source) are corrected, if necessary.

At step 240, the corrected packets associated with the second transport stream are provided to a back end device via a second medium in a second transport stream.

At step 250, the second transport stream packets are retrieved and utilized. That is, at step 250 the back end device 104 retrieves from the second medium 103 the corrected packets forming the second transport stream and processes those packets to extract the underlying data, illustratively video data and associated audio data, which is then decoded and utilized (e.g., presented).

In one embodiment of the invention, the above-described transport streams and the audiovisual sub-streams included therein (i.e., video stream V and audio stream A processed by back-end device 104) may comprise transport streams, packetized elementary streams (PES) or elementary streams according to any of the Moving Pictures Experts Group (MPEG) standards. Specifically, a first standard known as MPEG-1 refers to ISO/IEC standards 11172 and is incorporated herein by reference in its entirety. A second, known as MPEG-2, refers to ISO/IEC standards 13818 and is incorporated herein by reference. Additionally, a compressed digital video system is described in the Advanced Television Systems Committee (ATSC) digital television standard document A/53, which is incorporated herein by reference in its entirety. Similar standards such as those describing the MPEG-4, MPEG-7 and European Digital Video Broadcast (DVB) standards may also be advantageously applied and also incorporated here in by reference in their respective entireties. Additionally, various transport protocols such as ATM, IP, and the like are referenced in the above-cited standards documents and are also incorporated herein by reference in their respective entireties.

Although various embodiments, which incorporate the teachings of the present invention, have been shown and described in detail herein, those skilled in the art can readily devise many other varied embodiments that still incorporate these teachings.

What is claimed is:

1. Apparatus, comprising:
    a modem, for receiving from a first medium a first transport stream having disposed therein packets associated with a second transport stream, said second transport stream packets being susceptible to timing errors;
    a data control module, for translating said second transport stream packets in a manner tending to reduce said timing errors, said data control module utilizing timing information recovered from at least one of said first transport stream and said second transport stream; and
    a transport interface, for providing said packets associated with said second transport stream to a back-end device having a peripheral component interconnect (PCI) interface via a second non-PCI transport medium so as to bypass the PCI interface of the back-end device.

2. The apparatus of claim 1, further comprising a router, for routing transport packets from said modem to said data control module.

3. The apparatus of claim 1, further comprising an interface module for transferring data between said data control module and a computing device, said interface module tending to induce said timing errors within said packets associated with said second transport stream, said data control module operating to reduce said timing errors induced by said interface module.

4. The apparatus of claim 1, further comprising a back-end processing device, for receiving said packets associated with said second transport stream via said second transport medium.

5. The apparatus of claim 1, further comprising a transport processor, for retrieving packetized elementary streams from said second transport stream propagated through said second transport medium.

6. The apparatus of claim 5, further comprising at least one elementary stream processing device, for processing retrieved packetized elementary streams provided by said transport processor.

7. The apparatus of claim 6, wherein said transport processor and each of said at least one elementary stream processing device is implemented by respective reduced instruction set (RISC) computing devices.

8. The apparatus of claim 1, wherein said first transport stream comprises one of an asynchronous transfer mode (ATM) or internet protocol (IP) transport stream, said second transport stream comprises one of an MPEG-1, MPEG-2, MPEG-4 and MPEG-7 transport stream.

9. The apparatus of claim 1, wherein the PCI interface of the back-end device is capable of receiving communications from said modem.

10. A set top terminal (STT) having a front-end device for retrieving a first transport stream from an access network and delivery to a back-end device for processing audiovisual sub-streams included within said first transport stream to produce audiovisual signals suitable for presentation, said front-end device comprising:
    a modem, for receiving said first transport stream from said access network, said first transport stream having disposed therein packets associated with a second transport stream, said second transport stream packets forming said audiovisual sub-streams and being susceptible to timing errors;
    a data control module, for translating said second transport stream packets in a manner tending to reduce said timing errors, said data control module utilizing timing information recovered from at least one of said first transport stream and said second transport stream; and
    a transport interface, for providing said packets associated with said second transport stream to a back-end device having a peripheral component interconnect (PCI) interface via a second non-PCI transport medium so as to bypass the PCI interface in the back-end device.

11. The STT of claim 10, wherein said front-end device further comprises a router, for routing transport packets from said modem to said data control module.

12. The STT of claim 10, wherein said front-end device further comprises an interface module for transporting data between said data control module and a computing device, said interface module tending to induce said timing errors within said packets associated with said second transport stream.

13. The STT of claim 10, wherein said first transport stream comprises one of an asynchronous transfer mode (ATM) or internet protocol (IP) transport stream, and said second transport stream comprises one of an MPEG-1, MPEG-2, MPEG-4 and MPEG-7 transport stream.

14. The SST of claim 10, wherein the PCI interface of the back-end device is capable of receiving communications from said modem.

15. A method, comprising:
    receiving, from a first medium, a first transport stream having disposed therein packets associated with a second transport stream, said first medium tending to impart jitter to said first transport stream;
    extracting, from said first transport stream, those packets associated with said second transport stream;
    translating using timing information derived from at least one of said first and second transport streams said extracted packets in a manner tending to reduce said jitter; and
    transmitting said translated extracted packets, to a back-end device having a peripheral component interconnect (PCI) interface, via a second non-PCI medium so as to bypass the PCI interface in the back-end device.

16. The method of claim 15, wherein said first transport stream corresponds to a first transport stream format and said second transport stream corresponds to a second transport stream format.

17. The method of claim 16, wherein said first transport stream format comprises at least one of an asynchronous transfer mode (ATM) format and an Internet protocol (IP) format.

18. The method of claim 16, wherein said second transport stream format comprises one of an MPEG1, MPEG2, MPEG4 and MPEG7 transport stream format.

19. The method of claim 15, wherein the PCI interface of the back-end device is capable of receiving communications from said modem.

* * * * *